United States Patent [19]

Bennion

[11] Patent Number: 4,732,599
[45] Date of Patent: Mar. 22, 1988

[54] METHOD FOR MANUFACTURE OF OPTICAL DEVICES

[75] Inventor: Ian Bennion, Ravensthorpe, England

[73] Assignee: Plessey Overseas Limited, Ilford, England

[21] Appl. No.: 769,213

[22] Filed: Aug. 26, 1985

[51] Int. Cl.⁴ .................. C03C 15/00; C03B 23/20; C03B 11/08; C03B 33/00
[52] U.S. Cl. ........................ 65/30.13; 65/36; 65/38; 65/42; 65/56
[58] Field of Search ............... 65/30.13, 31, 36–38, 65/42, 56, 155, DIG. 11

[56] References Cited

U.S. PATENT DOCUMENTS

| 3,940,301 | 2/1976 | Straw et al. | 65/36 |
| 4,331,383 | 5/1982 | Christiansen | 65/36 |
| 4,509,248 | 4/1985 | Spitzer et al. | 65/36 |
| 4,576,623 | 3/1986 | Mann | 65/37 |

OTHER PUBLICATIONS

Okawa et al., "Optical Tap Array Using Distributed—Index Planar Microlens", Electronics Letters, 4/15/82, vol. 18, No. 8, pp. 316–317.

Primary Examiner—S. Leon Bashore
Assistant Examiner—Michael K. Boyer
Attorney, Agent, or Firm—Michael F. Oglo; Julian C. Renfro

[57] ABSTRACT

A method of fabricating optical sensing devices for detecting displacement of a part thereof comprising the steps of bonding a multiplicity of optical devices to one surface of a relatively large transparent substrate so that the optical devices are accurately located relative to one another and to the substrate itself, securing to the opposite surface of the substrate and one surface of a transparent optical element-carrying substrate in parallel relationship thereto resilient spacer support means and dividing the entire assembly into individual unit parts each of which comprises an optical device bonded to one substrate unit and coupled to another substrate unit having its own optical element by a divided part of the resilient spacer support means so that the two substrate units are resiliently mounted relative to one another whereby relative movement between the two substrate units produces variations in the optical characteristics of the device which can be sensed.

7 Claims, 11 Drawing Figures

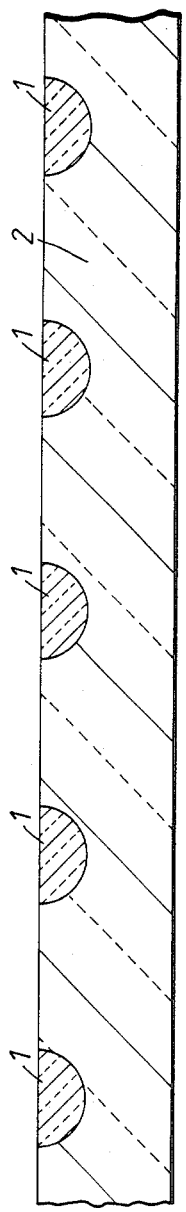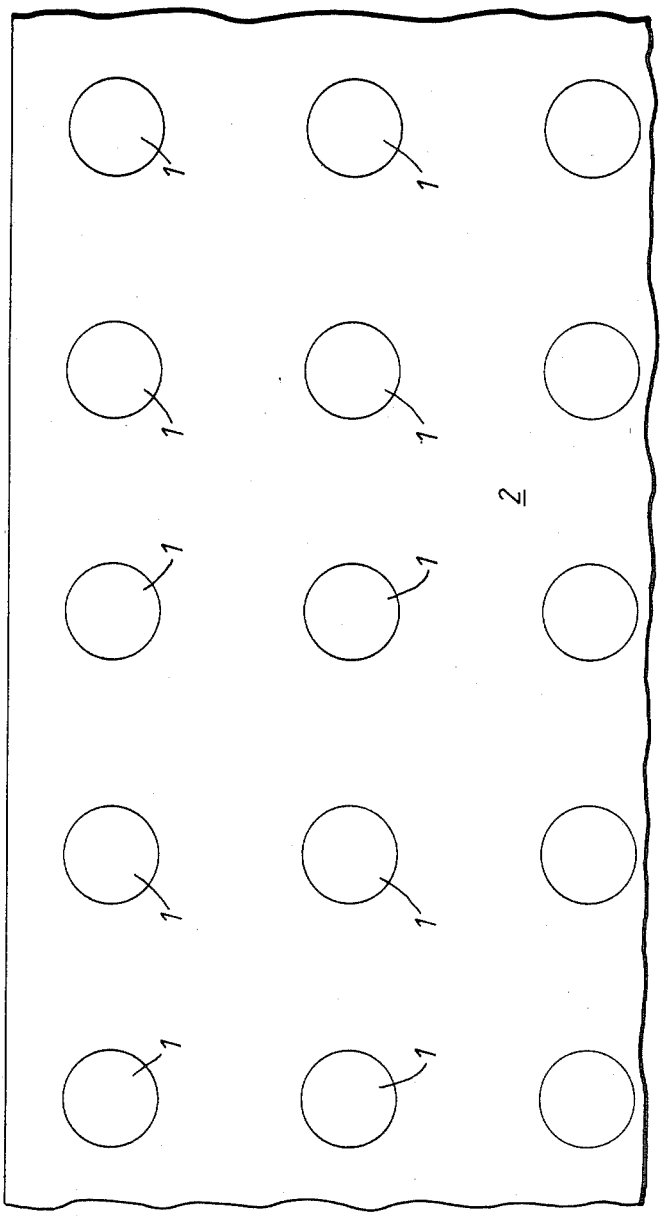

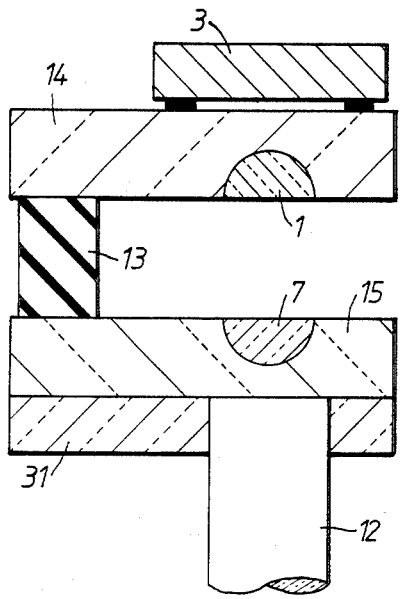
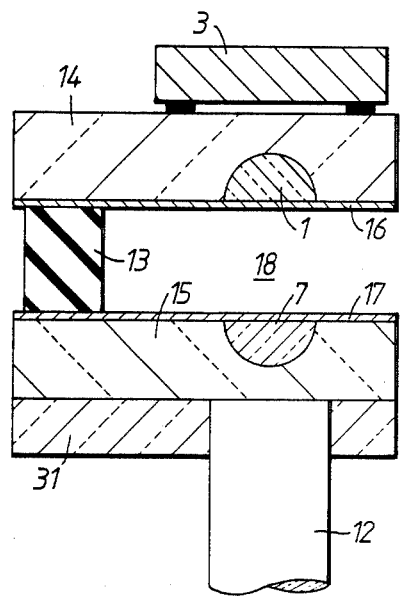
FIG. 5.   FIG. 6.
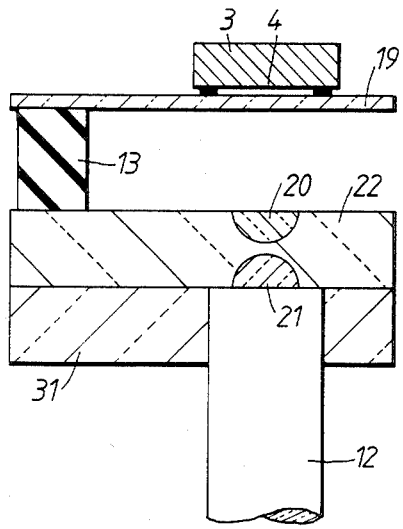
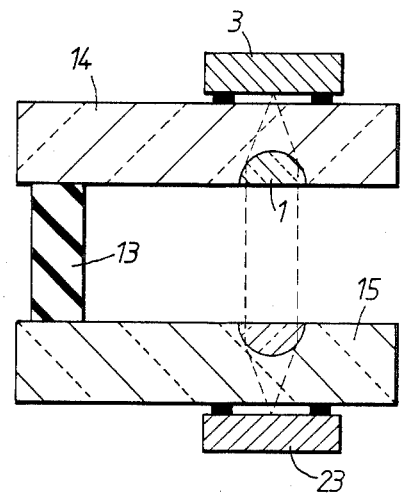
FIG. 7.   FIG. 8.

METHOD FOR MANUFACTURE OF OPTICAL DEVICES

BACKGROUND OF THE INVENTION

This invention relates to optical devices and relates more specifically to relatively large-volume low-cost fabrication of optical sensing devices which may be used for example in hydrophones for the detection of underwater acoustic waves or in other applications, for the detection, monitoring and/or measurement of such variables as pressure, velocity, acceleration, temperature, displacement etc.

SUMMARY AND OBJECT OF THE INVENTION

In co-pending patent application Ser. No. 720,715 of Davis, Morgan and Goodfellow, there is described a method of fabricating optical devices, in which a substrate assembly, comprising a glass sheet having diffused therein an array of planar lenses and having bonded thereto in predetermined accurate positional relationship with the aforesaid planar lenses a multiplicity of optical devices, is divided into a relatively large number of unit parts each of which comprises an optical device with an associated planar lens. The accurate positioning of the optical devices relative to their respective planar lenses is achieved according to one method by the formation of metallic bonding pads at relatively precise locations the substrate surface using photolithographic techniques and by solder-bonding these pads to correspondingly-positioned metallic pads formed at appropriate locations on one surface of the optical devices to be attached to the lens substrate so that they are in correct alignment with the axes of the planar lenses.

The primary objective of the method forming the subject of the aforesaid co-pending patent application is the relatively large-volume low-cost precision production of optical devices (e.g light-emitting-diodes, photo-transistors, photo-diodes etc) having their own individual planar lenses.

The present invention has a similar objective, namely the fabrication of optical devices having individually associated planar lenses but the optical devices concerned are of a form capable of sensing displacement (e.g. oscillation or deflection) of part of the device structure which produces variation of the optical characteristics of the device.

According to the present invention there is provided a method of fabricating optical sensing devices for detecting displacement of a part thereof, comprising the steps of bonding a multiplicity of optical devices (e.g. light-emitting-diodes, photo-transistors or photo-diodes) to one surface of a relatively large transparent substrate (e.g. glass) so that the optical devices are accurately located relative to one another and to the substrate itself, securing to the opposite surface of the substrate and one surface of a transparent optical element-carrying substrate (e.g. glass) in parallel relationship thereto resilient spacer support means and dividing the entire assembly into individual unit parts each of which comprises an optical device bonded to one substrate unit and coupled to another substrate unit having its own optical element by a divided part of the resilient spacer support means so that the two substrate units are resiliently mounted relative to one another whereby relative movement between the two substrate units produces variations in the optical characteristics of the device which can be sensed.

In carrying out the present invention, one or both of the transparent substrates may embody planar lenses produced therein by diffusion or ion-exchange and associated respectively with the optical devices bonded to one of the substrates. Consequently, the position of the optical devices in relation to the optical axes of the diffused planar lenses will need to be accurately predetermined as by the provision of bonding pads on the substrate(s) and optical devices using photo-lithographic techniques similar to those referred to earlier in connection with the method according to co-pending patent application Ser. No. 720,715 of Davis, Morgan and Goodfellow.

The resilient spacer support means may for example, comprise elastomer material (e.g. silicone rubber) moulded into the form of a lattice structure which may be cemented on the opposite sides thereof to the opposed surfaces of the transparent substrates in accurate positional relationship therewith so that openings in the moulded lattice structure are located along the optical axes of the planar lenses diffused into one or both of the aforesaid substrates. The moulded lattice structure may also be so arranged that when the assembly is divided into a multiplicity of unit parts, cross-members of the moulded structure are divided into blocks positioned so as to support the substrates relative to one another in cantilever fashion.

As an alternative arrangement to the moulded lattice structure of elastomer material, the spacer support means may where increased durability is required comprise a lattice structure of springy metal having a generally similar configuration to the moulded elastomer structure but having channel-shaped cross members, the web parts of which when the assembly is divided into a multiplicity of separate unit parts define spring strip support members which support the substrate units of the individual sensing devices in cantilever fashion relative to one another.

Optical sensing devices of various forms may be fabricated according to the invention without departing from the principles involved. For example, arrays of planar lenses may be diffused into the opposed surfaces of the two substrates with the optical axes of corresponding lenses in the two substrates being accurately aligned with one another. The optical axes of the planar lenses in one of the substrates will be aligned with the active surfaces of the optical devices (e.g. light-emitting-diodes) bonded to the remote surface of the same substrate whereas the optical axes of the planar lenses formed in the other substrate may be accurately aligned with holes formed in the latter substrate, as by etching for receiving the ends of optical fibres, or with the active surfaces other optical devices (e.g. photo-transistors) bonded to the latter substrate.

In another contemplated embodiment of the invention, the substrate to which the optical devices are bonded comprises a plain transparent (e.g. glass) plate and like arrays of planar lenses are diffused into the opposite surfaces of the other substrate with the optical axes of corresponding diffused planar lenses in the respective surfaces being in accurate alignment with one another and with the light-responsive or generative surfaces of the optical devices.

By way of example, a number of embodiments of the present invention will now be described with reference to the accompanying drawings.

BRIEF DESCRIPTION OF THE DRAWINGS

FIGS. 1 and 2 are fragmentary cross-sectional and plan views of a diffused planar lens array produced on a glass substrate;

FIG. 5 shows one of a multiplicity of optical sensing devices divided from the assembly shown in FIG. 4;

FIG. 6 shows one alternative embodiment to the optical sensing device shown in FIG. 5;

FIGS. 7 and 8 show further alternative embodiments of optical sensing devices produced according to the invention;

DESCRIPTION OF SPECIFIC EMBODIMENTS

Figure 3:
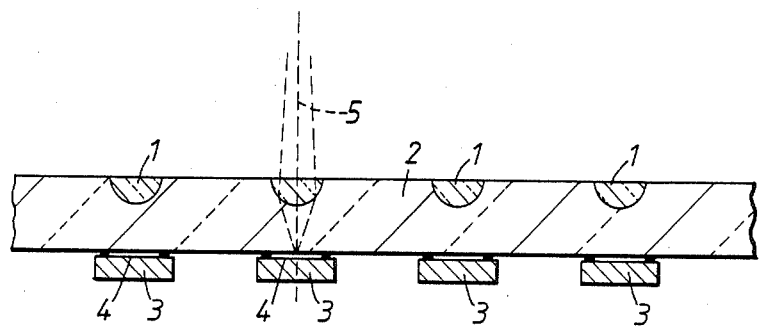
FIG. 3 is a view similar to FIG. 1 but with the planar lens array substrate having a plurality of optical devices bonded thereto.

Referring to FIGS. 1 and 2 of the drawings, the planar lens array illustrated may be fabricated by the method described in co-pending patent application Ser. No. 720,715 of Davis, Morgan and Goodfellow. The array comprises a multiplicity of lenses 1 diffused into one surface of a glass substrate 2. As can be seen in FIG. 3, to the surface of the substrate 2 remote from the planar lenses 1 are bonded a multiplicity of optical devices 3 (e.g. light-emitting-diodes, photo-transistors or photo-diodes) associated with the respective lenses. The bonding of these optical devices 3 to the substrate 2 so that the light-responsive or generative surfaces 4 of the devices are correctly aligned with the optical axes 5 of the lenses may be accomplished as fully described in the aforesaid co-pending patent application.

Figure 4:
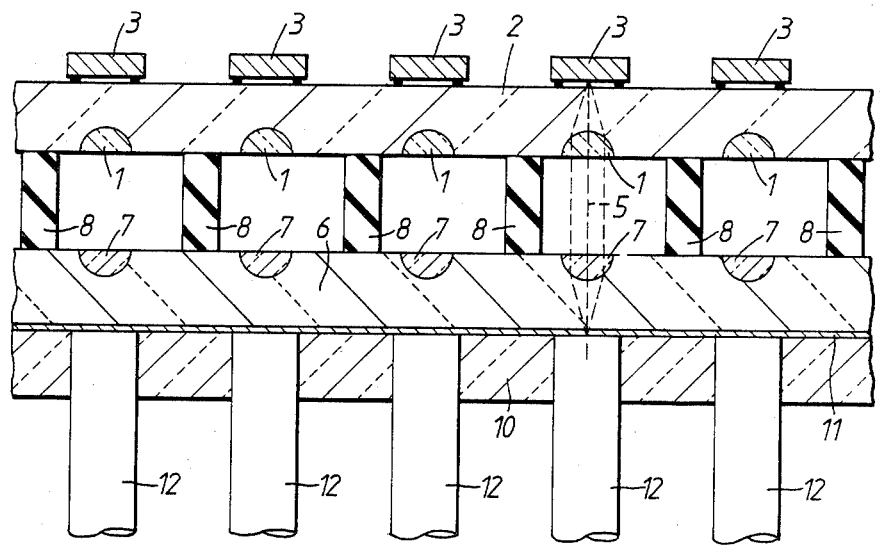
FIG. 4 is a view similar to FIG. 3 in which an optical fibre terminal assembly lens substrate is bonded to the planar lens/optical device array of FIG. 3 in spaced relationship therewith by means of an interposed resilient spacer support structure.
Figure 9:
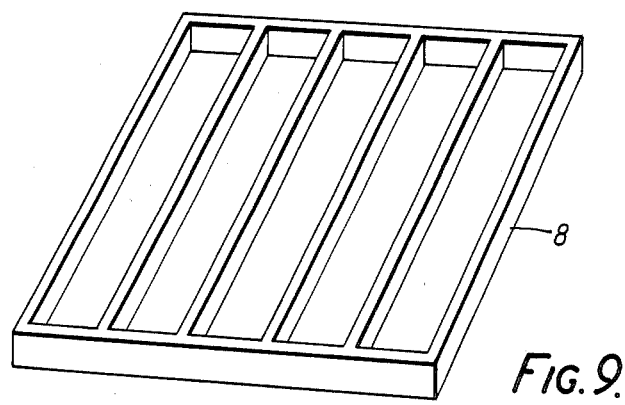
FIG. 9 shows a perspective view of the resilient spacer support structure included in the array of FIG. 4.

Referring now to FIG. 4 of the drawings, it will be seen that a second glass substrate 6 similar to the substrate 2 and embodying an array of diffused planar lenses 7 which may be of equal or different power to lenses 1 is supported in parallel spaced apart relationship with the lens substrate 2 by means of a resilient spacer/support lattice structure 8 of the form shown in perspective in FIG. 9. The structure 8 is bonded (e.g. cemented) to the opposed surfaces of the two substrates 2 and 6 so that the planar lenses 1 and 7 of the two substrate lens arrays are in correct optical alignment (i.e. co-incident optical axes). The lattice structure 8 may be moulded from silicone rubber or any other suitable elastomer.

The planar lens substrate 6 in the present embodiment has an apertured glass substrate 10 suitably bonded to it with or without the interposition of an anti-reflective coating 11. The substrate 10 has extending therethrough an array of holes which may be produced by etching and which receive the ends of optical fibres 12 (multimode or monomode).

The respective fibres 12 of the array will need to be correctly aligned with the optical axes of the planar lenses and it may here be mentioned that by the utilisation of photo-lithographic techniques in the fabrication of the planar lens and apertured substrates 2, 6 and 10 and in the bonding of the optical devices 3 to the substrate 2 and by the utilisation of precise registration procedures for the various assembly parts relative to one another, an overall high degree of optical precision can readily be achieved during fabrication of the optical devices. More specifically, registration of any one part with any other is readily accomplished at the array stage by means of alignment marks incorporated into all photolithographic masks. Registration of the two completed sub parts to be joined through the elastic member is easily accomplished by utilsing the inbuilt optical parts (i.e. inject light and detect).

The substrate/device assembly shown in FIG. 4 may then be divided into individual optical sensing devices of the form shown in FIG. 5 by cutting (e.g. sawing) vertically through the lens substrates 2, 6 and 10 and the spacer support structure 8 of the assembly shown in FIG. 4 along sets of lines at right angles to one another.

As will readily be apparent from FIG. 5, the divided block portion 13 of the resilient spacer support structure 8 serves to support the divided parts 14, 15 and 31 of the planar lens substrates 2 and 6 and apertued substrate 10 (FIG. 4) in cantilever fashion. Consequently, if the substrate part 14 were subjected to displacement(s) (e.g. oscillatory) whilst the parts 15 and 31 are restrained against movement the optical characteristics of the device would be varied and such variations can be utilised for the detection, monitoring and/or measurement of such displacement(s). The displacement(s) could be produced by underwater acoustic waves impinging directly on the substrate part 14 when the optical sensing device is embodied in a hydrophone (sonobuoy). Alternatively, some mechanical linkage could be provided between the substrate part 14 and actuating means responsive to variations in temperature, pressure, velocity or acceleration etc.

Referring now to FIG. 6, this shows an optical sensing device of high sensitivity which can be fabricated in much the same way as the FIG. 5 embodiment, but utilising planar lens array substrates having high reflectivity layers 16 and 17 (e.g. metallic or dielectric) and spacing the two parallel lens substrates apart by a specific distance so that the space 18 between the substrate parts 14 and 15 acts as a Fabry-Perot cavity. Any displacement(s) of the substrate part 14 relatively to the part 15, as by the impingement on the part 14 of acoustic waves etc, and the rendering of parts 14 and 15 non-parallel will disrupt the total reflection within the cavity 8 and transmission of light between the optical device 3 and the optical fibre 12 can then occur. Such changes in optical characteristics may be detected by a detector (not shown) at the far end of the optical fibre 12, when the optical device 3 is a light generating device (e.g. light-emitting-diode).

In FIG. 7 which shows an alternative embodiment to that depicted in FIG. 5, the optical device 3 is bonded to a relatively thin plain glass plate substrate part 19 and the diffused planar lenses 20 and 21 are both formed as shown in the glass substrate part 22 so that the optical axes of the lenses are coincident with one another and correctly aligned with the active surface 4 of the optical device 3 and the optical fibre 12. In this embodiment, displacement(s) of the relatively thin glass substrate part 19, such as due to acoustic waves impinging thereon and facilitated by the elastomer (e.g. silicone rubber)

spacer support 13 will produce variations in the optical characteristics of the device and these can be detected by detector means which may be associated with the optical device 3 in the case of the latter being a light responsive device (e.g. photo-transistor or photo-diode) or which may be located at the far end of the optical fibre 12 when the optical device 3 is a light generative device (e.g. light-emitting-diode). Since the substrate part 19 has lower inertia by virtue of its lighter construction the device will have increased sensitivity.

Referring now to FIG. 8 of the drawings, this shows a device constructed in accordance with the present invention but incorporating a second optical device 23. This second optical device 23 effectively replaces the optical fibre 12 of the FIG. 5 embodiment and light detector or generative means at the far end of the fibre 12 and will comprise a light-responsive device (e.g. photo-transistor or photo-diode) when the optical device 3 is a light-generative device (e.g. light-emitting-diode) and vice versa. By monitoring the output from the light-responsive device, displacement(s) of the substrate part 14 relative to the other part 15 in the vertical direction, as viewed in the Figure, can be detected, monitored and/or measured.

As previously mentioned the elastomer spacer support lattice structure 8 as shown in FIG. 9, serves to provide the resilient support blocks 13 (e.g. FIG. 8) to facilitate movement of the upper substrate parts of the devices described and illustrated. The lattice structure 8 may be of moulded construction and cemented to the glass substrate 2 and 6 (FIG. 4).

Figure 10:
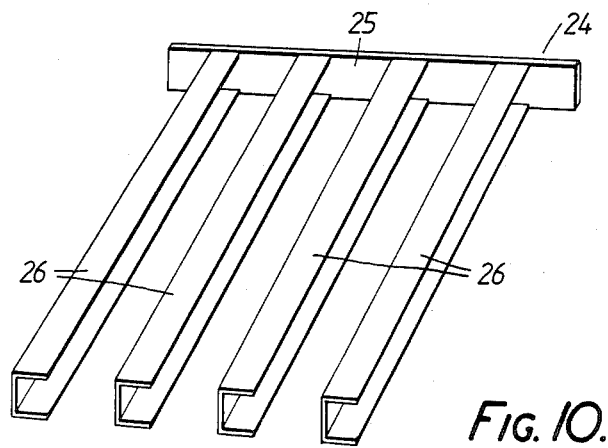
FIG. 10 shows a perspective view of part of an alternative form of resilient spacer support structure to that shown in FIG. 9; and, FIG. 11 shows the optical sensing device of FIG. 5 as modified when a resilient spacer support structure of the form shown in FIG. 10 is employed.
Figure 11:
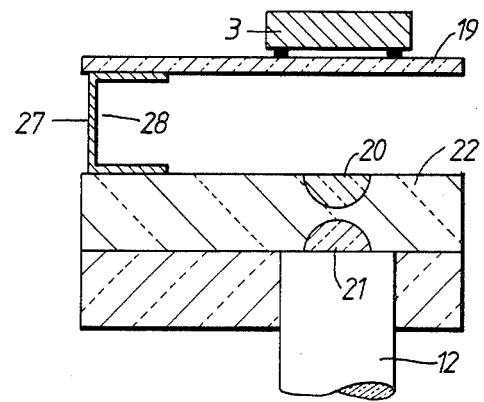

An alternative form of lattice spacer support structure which may be employed when increased durability is required is shown in part in FIG. 10. This comprises a metal structure 24 having end plates, one of which is shown at 25, to which are secured as by cementing or welding cross members 26 of channel-shape cross section. Springy metal will be used for the cross rembers to facilitate displacement of the upper substrate part and as can be seen from FIG. 11, it is the web 27 of the divided structure part 28 which will flex as the substrate part 14 of the device is deflected.

In all of the optical devices described mechanical and electrical connections between the optical devices 3, 23 and their substrates may be made in the manner described in the previously-mentioned co-pending patent application and further electrical components and thick-film circuitry could also be provided on the substrates.

From the foregoing, it will readily be apparent that all of the optical devices described can be fabricated by the multiple device assembly/subsequent cutting process of the present invention which facilitates large volume precision manufacture of such device at relatively low cost.

I claim:

1. A method of fabricating optical sensing devices for detecting displacement of a part thereof comprising the steps of producing an assembly of optical sensing devices by bonding a multiplicity of optical devices to one surface of a relatively large transparent substrate so that the optical devices are accurately located relative to one another and to the substrate itself and securing the opposite surface of said substrate to one surface of another transparent optical element in parallel relationship by a resilient lattice spacer support means and then dividing the entire assembly into a multiplicity of individual unit parts each of which comprises an optical device bonded to one substrate unit and coupled to another substrate unit embodying an optical element, the coupling being provided by a divided part of the resilient lattice spacer support means which resiliently supports the two substrate units relative to one another in a cantilever fashion whereby relative movement between the two resiliently supported substrate units produces variations in the spacing between the optical device and the optical element and resulting in changes in the optical characteristics of the device which are sensed.

2. The method as claimed in claim 1, in which one or both of the transparent substrates futher comprises an array of planar lenses produced therein by diffusion or ion exchange.

3. The method as claimed in claim 2, in which the positions of the optical devices in relation to the optical axes of the diffused planar lenses are accurately predetermined by the provision of bonding pads on at least one substrate.

4. The method as claimed in claim 2, in which the resilient spacer support means comprises elastomer material moulded into the form of a lattice structure which is cemented on the opposite sides thereof to the opposed surfaces of the transparent substrates so that openings in the moulded lattice structure are located along the optical axes of the planar lenses diffused into one or both of said substrates.

5. The method as claimed in claim 1, in which the support means comprises a lattice structure of metal having channel-shaped cross members, the web parts of which when the assembly is divided into a multiplicity of separate unit parts defining strip support members which support the substrate units of the individual sensing devices in cantilever fashion relative to one another.

6. The method as claimed in claim 2, in which arrays of planar lenses are diffused into the opposed surfaces of the two substrates with the optical axes of corresponding lenses in the two substrates being accurately aligned with one another, the optical axes of the planar lenses in one of the substrates being aligned with the active surfaces of the optical devices bonded to the remote surface of the same substrate.

7. The method as claimed in claim 1, in which the substrate to which the optical devices are bonded comprises a plain transparent plate and like arrays of planar lenses are diffused into the opposite surfaces of the other substrate with the optical axes of the corresponding diffused planar lenses in the respective surfaces being in accurate alignment with one another and with the light-responsive or light generative surfaces of the optical devices.

* * * * *